Figure 1:
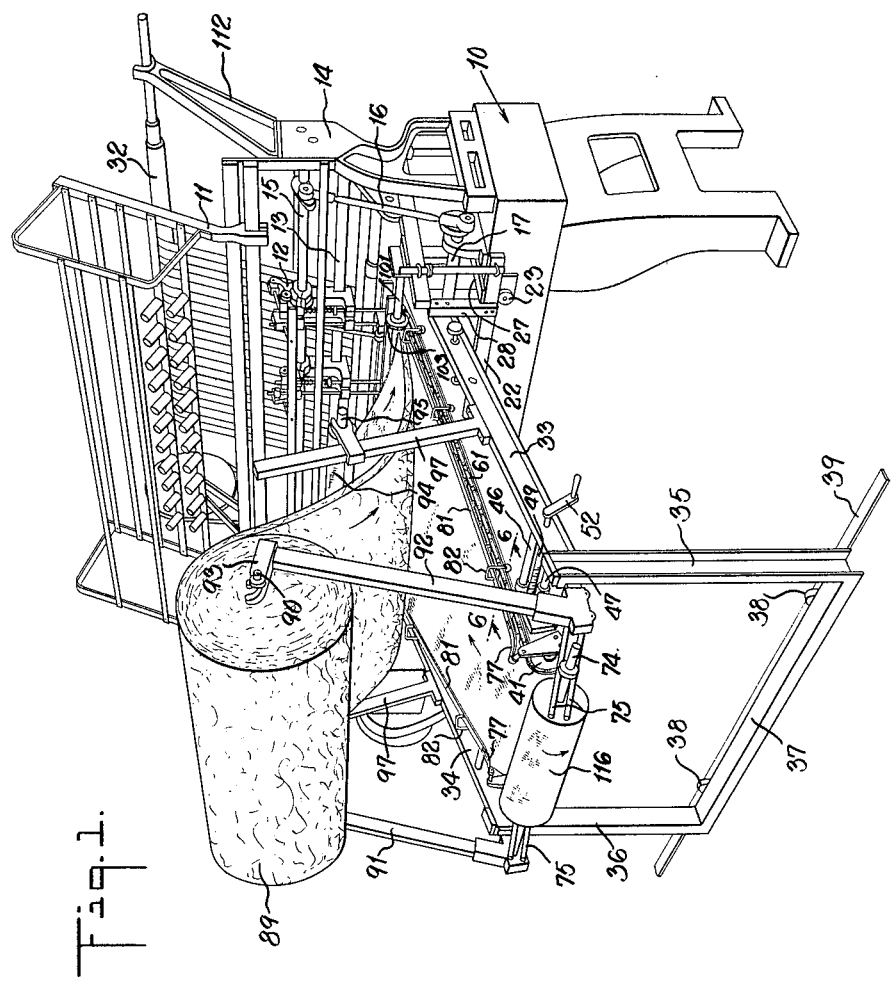

Aug. 3, 1965  K. SCHLEGEL  3,198,149
MACHINE FOR MAKING STRETCHABLE QUILTED FABRIC
Filed April 1, 1964  5 Sheets-Sheet 1

INVENTOR.
KURT SCHLEGEL
BY Benj. J. Rauber
ATTORNEY

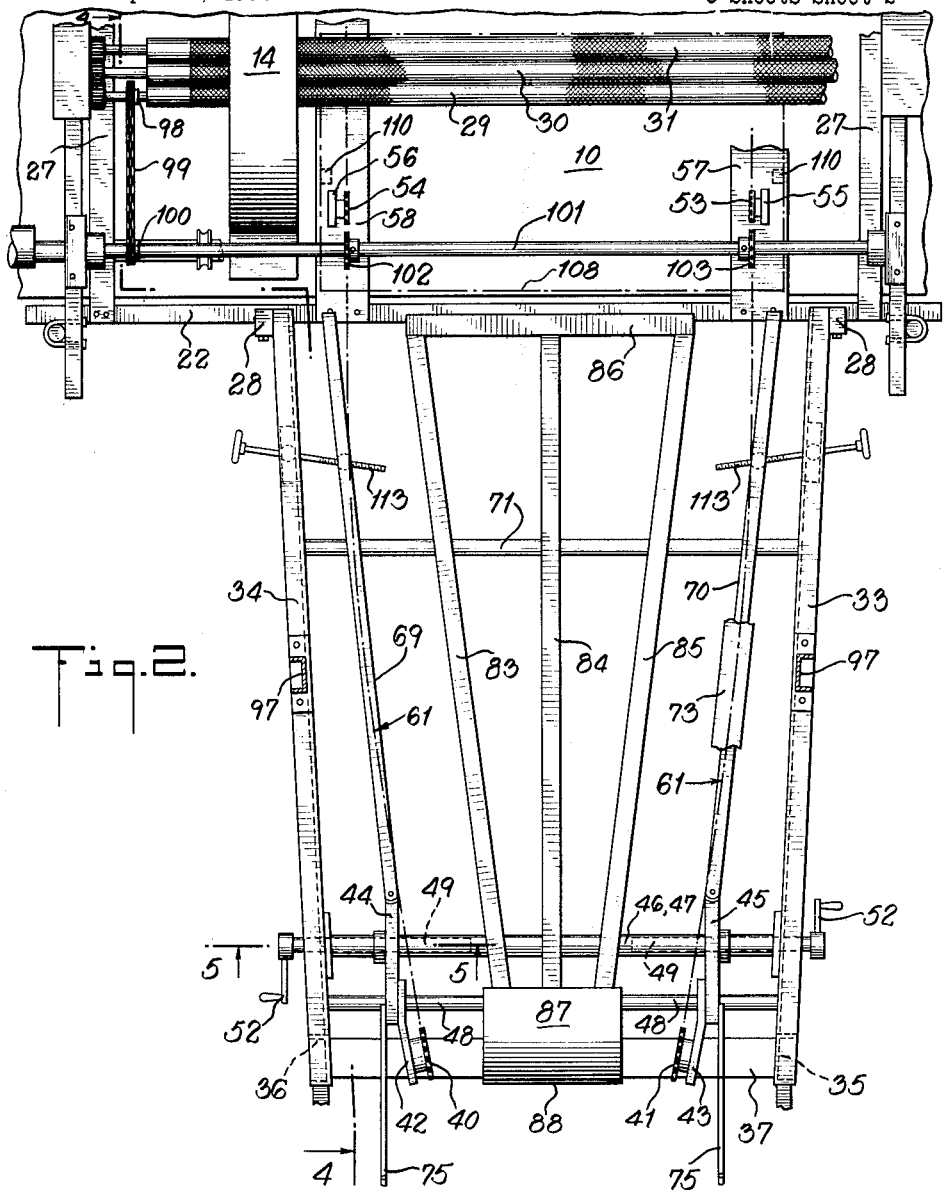

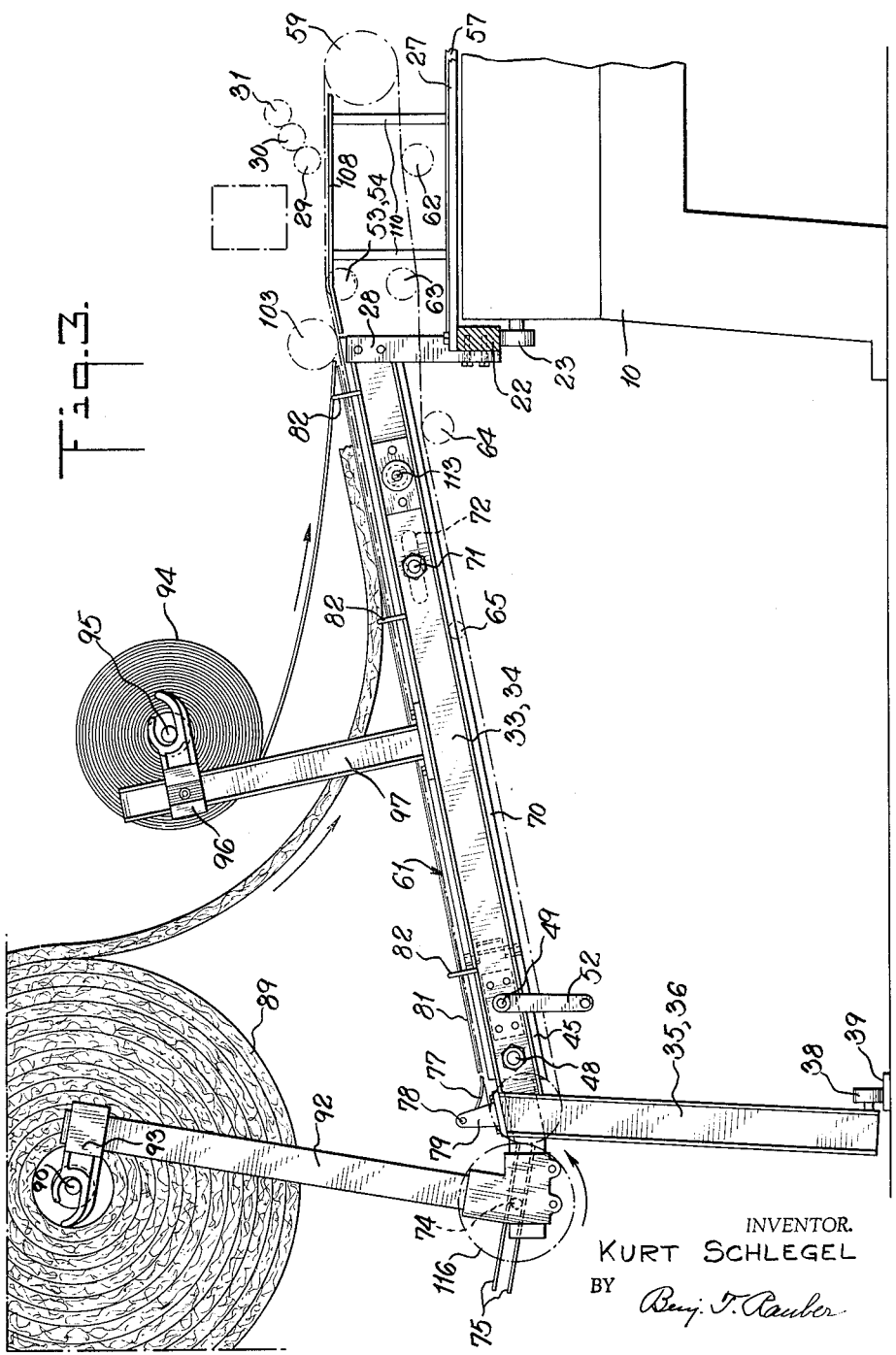

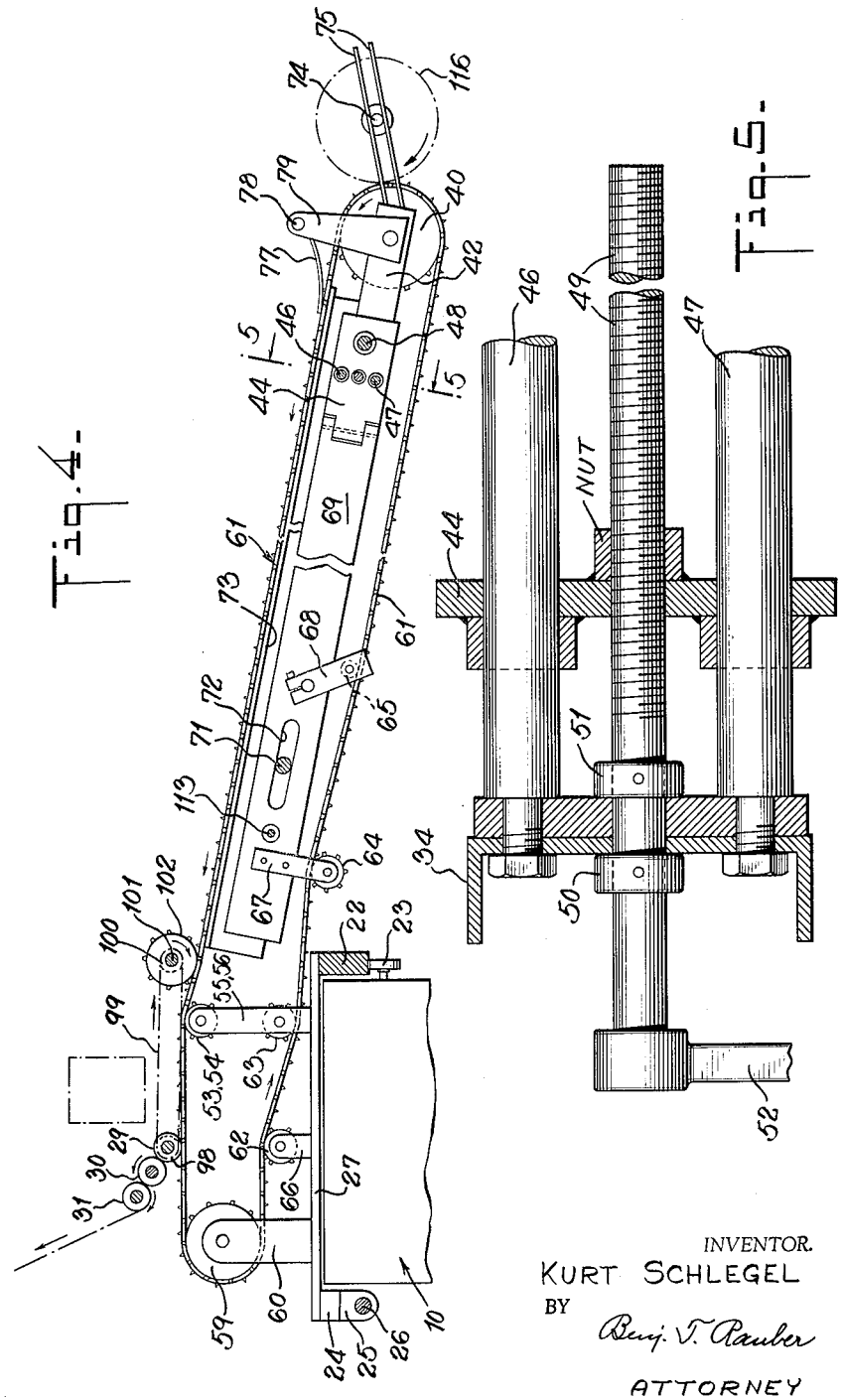

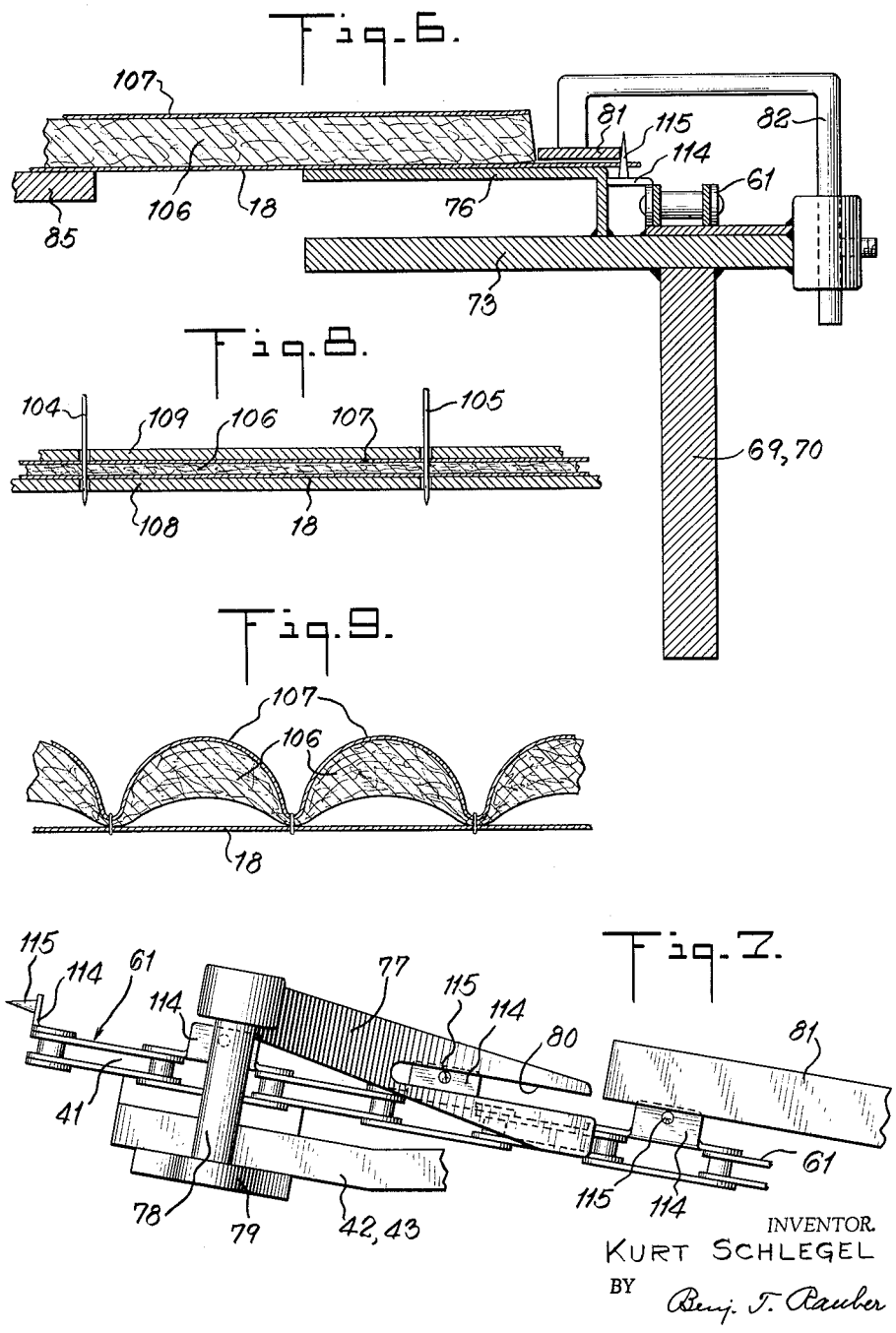

3,198,149
MACHINE FOR MAKING STRETCHABLE QUILTED FABRIC
Kurt Schlegel, Old Westbury, N.Y.
(% Edgewater Machine Co. Inc., College Point, N.Y.)
Filed Apr. 1, 1964, Ser. No. 356,612
16 Claims. (Cl. 112—118)

My present invention relates to a stretchable quilted fabric and to a method and a machine for making same.

The quilted fabric of my invention comprises a stretchable lower or foundation sheet, on which is superposed an upper or facing sheet and, preferably a filler sheet or layer between the foundation sheet and the facing sheet, the assembly of these sheets being stitched together by stitchings spaced throughout the area of the fabric. The facing sheet and the filler layer are contracted and puffed or puckered between the stitchings when the fabric is not stretched but straighten when the foundation sheet is stretched. The foundation sheet is one that stretches when a stretching force is applied and contracts when the force or stress is released. This is of advantage in giving greater freedom of movement when the fabric is used in garments, or articles of apparel, in quiltings, and for various other purposes when it is desired to provide a close fitting cover for articles.

The foundation or under sheet may be of the type known as "tricot." The filler layer, when, as generally is the case, a filler layer is used, may be a felted sheet of more or less closely felted fibers or it may be an unfelted layer of feathers, down, or other loosely assembled material. The stitching holds the filler layer in place between the foundation sheet and the facing sheet. The facing sheet may be of woven fabric or of a sheet of leather or other suitable material.

In the method of making the stretchable quilted fabric the foundation sheet is advanced to a quilting machine and is stretched transversely of its direction of movement from its normal unstretched width to a greater width. When it attains its stretched width the filler layer is laid onto the stretched foundation layer and the facing layer is laid onto the filler layer. The width of the filler layer and of the facing sheet is approximately the width of the stretched foundation sheet. When thus assembled, the assembly is passed through the quilting machine, where it is stitched together by spaced stitchings, which may be straight and parallel or zigzag or in a design determined by the quilting machine. The foundation sheet is held stretched during the stitching in the quilting machine and after the stitching is completed, the assembly contracts, the filler and facing sheet puffing or puckering according to the particular conditions of the stitchings and the character of the filler and facing sheet.

The apparatus for making the quilted, stretchable fabric comprises a tentering element of a suitable construction for engaging the edges of the foundation sheet and stretching and guiding it in its passage from a supply roll to and through the quilting machine. The tentering element comprises a pair of endless chains trained over successive sprockets in an upper reach and returning in a lower reach.

Each chain has a series of pins mounted on and spaced inboard of the links of the chain to point upwardly in the upper reach of the chain. The chains move from the lower reach to the upper reach about a pair of front sprockets so spaced as to position the pins within the edge margins of the foundation sheet. A supply roll of the foundation sheet is positioned to contact the chains as they move about the sprocket wheels so that the pins pick up the sheet at its margins and carry it along with the chains. The chains pass over guide sprockets spaced more widely than the front sprockets to stretch the foundation sheet. These guide sprockets are positioned immediately in front of the quilting machine. The chains then pass through the quilting machine to a pair of rear sprockets positioned rearwardly of the quilting machine and spaced apart the same distance as the guide sprockets. From the pair of rear sprockets the chains pass in a lower reach guided by spaced pairs of sprocket wheels to the front pair of sprocket wheels, the pairs of sprocket wheels guiding the chains in the lower reach being so spaced as to bring the chains to the same distance apart as the front sprocket wheels.

The front sprocket wheels are rotatably mounted in planes which diverge toward the guide sprockets, the divergence being such that their planes intersect the parallel planes of the guide sprockets in advance of the guide sprockets. This causes the chains to curve in such manner that they leave the front sprockets and enter the planes of the guide sprockets tangentially.

The filler layer is drawn from a supply roll in advance of the guide sprockets and rests on the foundation sheet shortly in advance of the guide sprockets. The facing sheet is drawn from a supply roll to lie on the filler layer just before the assembly of sheets and filler enters the quilting machine. After the assembly has been stitched it is drawn between drawing rolls and thence upwardly from the pins of the chains onto a wind-up roll. As the assembly is drawn free from the pins and the tension removed, the foundation sheet contracts to its unstressed width, puckering and puffing the filler layer and the facing sheet.

In order to draw the chains at the same speed as that at which the assembly is drawn through the quilting machine by the drawing rolls, the chains are driven by a pair of sprockets through a sprocket and chain drive from the drawing rolls.

The quilting machine may be of any suitable type having a stationary bank of needles, presser plates and shuttles for stitching the assembly, and a fabric advancing means for passing the fabric forwardly when the needles are raised clear of the fabric. This fabric feed comprises the drawing rolls. The supply rolls, chains and sprocket wheels of the tentering element are mounted on a bracket or framework secured to and projecting forwardly from the fabric feeding mechanism of the quilting machine.

When the bracket or frame is held stationary relative to the bank of needles, the rows of stitching will be straight and parallel. When the fabric feed means, together with the framework or bracket carrying the supply rolls and tentering elements are shifted back and forth transversely of the direction in which the assembly is moved through the quilting machine the lines of stitching may take other forms and designs may be made.

Means are provided on the framework supporting the tentering element to adjust the spacing of the sprocket wheels of the several pairs to different widths of fabric and different stretching or tentering of the foundation sheet.

The various features of the invention are shown, by way of example, in the accompanying drawings, in which:

FIG. 1 is a perspective view of the assembly of quilting machine and tentering and supply elements, FIG. 2 is a plan of a portion of the quilting machine and the tentering element, FIG. 3 is a side elevation of the tentering and supply element and a front portion of the quilting machine, FIG. 4 is a side elevation of the tentering element taken from the left of FIG. 2, on line 4—4, FIG. 5 is a section of a part of the tentering element taken on line 5—5 of FIG. 4, FIG. 6 is a vertical section of a part of the apparatus showing the position of a chain on the quilting machine, FIG. 7 is a plan of part of the tentering chain shown at the lower right of FIG. 7, FIG. 8 is a section of a part of the assembly of the foundation sheet, filler layer and facing sheet showing the penetration of the needles of the quilting machine, and FIG. 9 is a section of the finished fabric showing the puckering or puffing of the filler layer and the facing sheet when the tension on the foundation sheet is released and the assembly contracts.

As shown in FIG. 1, the tentering and feed elements are mounted in co-operative relation to a quilting machine comprising stitching mechanisms mounted in fixed position on a table 10. The stitching mechanism comprises a rack 11 for supporting spools of thread, and elements 12 for lifting and lowering the needles and presser plates at intervals. These elements are supported on rods 13 supported on standards 14 mounted on and extending upwardly from the table 10. They are actuated by a shaft 15 journaled at its ends in the standards 14 and rocked through a link 16 from a shaft 17 which is driven by a mechanism, not shown, to lift and lower the needles at successive intervals. Shuttles, not shown, are also actuated by this mechanism.

The assembly of foundation sheet, filler layer and facing sheet are guided and supported on a plate indicated at 108 in FIGS. 3 and 2. The drawing rolls 29, 30 and 31 are shown in FIG. 2 for drawing the assembly of quilting elements over the plate. The plate and the elements associated with it are mounted on an undercarriage which is slidably mounted on the table 10 to slide back and forth lengthwise thereof. The undercarriage comprises a front beam 22 mounted at the front of the table on rollers 23, FIGS. 1, 3 and 4, a rear beam 24 alongside the rear of the table as shown in FIG. 4 and supported by brackets 25 slidable on a rod 26 secured to the table, and cross beams 27 extending horizontally across the table and mounted on the front and rear beams. The plate 108 is supported above the undercarriage by means of uprights 110 on cross plates 57 and 58 secured to the front and rear beams 22 and 24.

The stitching elements and the movement of the fabric conveying elements are driven from a common motor by a mechanism well known in the art to shift the undercarriage and the elements carried by it back and forth and to rotate the drawing rolls to draw the fabric forwardly during intervals when the needles of the quilting machine are lifted free of the fabric. In the machine shown in the drawings there are three drawing rolls 29, 30 and 31 journaled at their ends in bearings secured to the undercarriage, the fabric passing upwardly from the plate 108 around the lower part of the lowermost roll 29 to the nip between this roll and roll 30, thence around the roll 30 and through the nip between this roll and roll 31 to a take up roll 32 supported on brackets 112 extending upwardly and rearwardly from the standards 14.

The elements for stretching the foundation sheet and for supplying this sheet, the filler layer and the facing sheet to the quilting machine are supported on a framework comprising a pair of supporting beams 33 and 34 secured at their rear, upper, ends to the uprights 28 as shown in FIGS. 1 and 3 and extending forwardly and downwardly therefrom and supported at their forward, lower, ends by a pair of uprights 35 and 36 connected at their lower ends by a cross beam 37. The cross beam is, in turn, supported by a pair of wheels 38 running on a track 39 to facilitate the shifting of the framework with the undercarriage of the quilting machine fabric feed.

A pair of front sprocket wheels 40 and 41 are mounted near the lower, front, ends of the beams 33 and 34 on brackets 42 and 43, respectively, carried on supporting plates 44 and 45 which are slidably mounted on a pair of vertically spaced rods 46 and 47 and a rod 48 spaced forwardly of the rods 46 and 47 as shown in FIGS. 2, 4 and 5, these rods being mounted at their ends in the beams 33 and 34. As shown in FIG. 5 the plates 44 and 45 have a threaded hole between the rods 46 and 47 through which is threaded a screw-threaded rod 49, rotatably mounted in the plates 44 and prevented from longitudinal movement by collars 50 and 51 whereby the plates may be adjusted to selected spacing between the beams 33 and 34. The screw-threaded rods 49 may be rotated by means of cranks 52.

The brackets 42 and 43 are bent as shown in FIG. 2 to provide faces lying in planes that diverge rearwardly. As shown in detail in FIG. 7, the plates 42 and 43 are provided with jack shafts extending normally to the diverging surfaces of the plates on which are journaled the front sprocket wheels 40 and 41. The planes in which these sprocket wheels rotate thus diverge rearwardly as shown in FIG. 2.

As shown in FIGS. 2 and 4 a pair of guide sprockets 53 and 54 are mounted on posts 55 and 56 supported on plates 57 and 58, respectively secured at their ends on the front and rear beams 22 and 24 of the under-carriage of the quilting machine. These sprocket wheels are spaced more widely than the front sprocket wheels to spread the chains and thus stretch the foundation sheet to the width required. These guide sprockets 53 and 54 rotate in spaced parallel planes in the direction of travel of the fabric assembly. A pair of rear sprockets 59, only one of which is shown, are similarly mounted on posts 60 to rotate in the same planes as those of the sprockets 53 and 54.

A pair of chains 61, one of which is shown in FIG. 4, one for each sprocket wheel 40 and 41, are trained about the front sprocket wheels and extend in an upper reach over the guide sprockets 53 and 54 to the rear sprocket wheels 59 and thence in a lower reach back to the front sprocket wheels 40 and 41. The chains are guided and supported in their lower reaches by pairs of sprocket wheels 62, 63, 64 and 65, passing over the sprocket wheels 62, under the sprocket wheels 63, over the sprocket wheels 64 and under the sprocket wheels 65. The sprocket wheels 62 are mounted on posts 66 on the cross beams 57 and the sprocket wheels 63 on the posts 55 and the planes of these sprocket wheels are the same as those of the guide sprockets 53 and 54 and 59. The sprocket wheels 64 and 65 are mounted on brackets 67 and 68, respectively, depending from a pair of beams 69 and 70 which as shown in FIG. 2 are pivoted on the plates 44 and 45 to diverge from front to rear, so that the front portions align approximately with the planes of the sprocket wheels 40 and 41. The bracket 68 is mounted to the beam on which each is mounted by means of a bolt so that it may be rotated and secured in positions to keep the chains sufficiently taut. The beams are supported rearwardly of their attachment to the plates 44 and 45 by means of a rod 71 secured at its ends in the beams 33 and 34 and passing through a slot 72 in the beams 69 and 70. The divergence of the beams 69 and 70 may be adjusted by means of rods 113, one for each beam rotatably mounted in fixed axial position in the respective beams 33 and 34 and threaded through nuts in the beams 69 and 70.

The chains 61 pass from the sprocket wheels 40 and 41 in the planes in which these sprockets rotate and pass to the guide sprockets 53 and 54 in the planes in which these sprockets rotate. This avoids any side pull or tension that might be caused by the chains coming to or leaving the sprocket wheels at an angle to their planes of rotation. Between the front sprocket wheels and the guide sprocket wheels, the chains curve concavely toward each other and enter the planes of rotation of these sprocket wheels tangentially. As pointed out above, in the lower reach of the chains they approach the front sprocket wheels in the plane of rotation of these wheels.

As shown in FIGS. 6 and 7, successive links of the chains are provided with brackets 114 on the inboard side of each chain, that is, on the side facing the opposite chain, and each bracket has a pin 115 extending outwardly, that is, outwardly from the axes of the sprocket wheels or upwardly in the upper reaches of the chains. In the portion of the upper reach of the chains between the front sprocket wheels and the guide sprocket wheels, the chains are supported on a flat horizontal flange 73 of the beams 69 and 70.

As shown in FIGS. 1, 3 and 4, a roll of the foundation sheet 18 is supported by means of a spindle 74 rotatably supported near its ends on a pair of bifurcated arms 75 mounted on and inclined upwardly from, the ends of the beams 69 and 70. The inclination of the arms serves to enable the roll to slide toward the portion of the chains carried by the front sprocket wheels so that the side margins of the sheet are penetrated by the pins of the chains and, as the sprocket wheels rotate, they draw the sheet progressively toward the quilting machine.

To support the margins of the sheet in its passage to the quilting machine, supporting strips 76 shown in cross section in FIG. 6, are mounted on and inboard of the beams 69 and 70 and spaced from these beams so that the pins 72 project above the upper surface of the strips. The margins of the foundation sheet pierced by the pins project beyond the strips as shown in FIG. 6.

To guide and hold the sheet in place as it is drawn from the roll, a pair of retaining plates 77, one for each chain, as shown in FIGS. 1, 4 and 7, are mounted by means of rods 78 on supports 79 projecting upwardly from the beams 69 and 70. The retaining plates 77 curve downwardly from the rods 78 as shown in FIG. 4 to press on the chains and are provided with slots 80 through which the pins 115 project as the chains are brought by the front sprocket wheels into their upper reach. These retaining plates hold the margins of the foundation sheet from slipping off the pins.

In the travel of the foundation sheet from the front sprocket wheels to the quilting machine, the sheet is held from displacement from the pins by a retaining strip or bar 81 just inboard of the pins and extending from the plate 77 as shown in FIG. 7 to the guide sprocket wheels. The retaining strip is supported by a succession of brackets 82 mounted on the flange 73 as shown in FIGS. 1, 3 and 6.

The foundation sheet is supported between the chains in its passage from the roll 116 to the quilting machine by spaced beams 83, 84 and 85, shown in plan in FIG. 2, supported on the transverse rods 48 and 71 and diverging from the rod 48 to a connecting bar 86 adjacent to the plate 18 of the fabric feeding element of the quilting machine. The divergence of these plates serves to distribute the support of the sheet evenly as the sheet is tentered. At the front ends of the beams a supporting plate 87 is mounted to extend forwardly and in a downward curve as indicated at 88 conforming with the peripheries of the front sprocket wheels 40 and 41 to limit the position of the roll of foundation sheet so that the teeth of the chains do not penetrate deeply into the roll or into the fabric but permitting deeper penetration as the fabric leaves the roll.

As shown in FIGS. 1 and 3, a roll 89 of filler material, such as felted fibres, carried on a spindle 90 is supported by a pair of uprights 91 and 92, extending upwardly from the beams 33 and 34, each having a slotted bracket 93 to receive and support the ends of the spindles. From this roll the filler is drawn by the foundation sheet and the facing sheet in a downward curve to join the foundation sheet at its fully tentered position. Similarly, as shown in FIG. 3, a roll 94 of facing sheet on a spindle 95 is supported in slotted brackets 96 on uprights 97 extending upwardly from the beams 33 and 34. Sheet from this roll is drawn onto the filler sheet at the rear end of the supporting frame of the tentering elements. These superposed elements then pass through the quilting machine where they are stitched by one or more rows of needles and shuttles, thence through the drawing rolls 29, 30 and 31 to the take-up roll 32.

Inasmuch as the assembly of foundation sheet, filler and facing sheet are supplied by the chains and pass through the drawing rolls at the same linear speed in successive intervals, the chains are driven from the drawing rolls through a sprocket 98, FIGS. 2 and 4, fixed on the shaft of driving roll 29 and through a chain 99 trained about this sprocket and a sprocket 100 fixed on a rotatable shaft 101 on which are fixed a pair of sprockets 102 and 103 which engage the chains 61.

The operation of the apparatus is briefly as follows:

The roll 116 of foundation or bottom sheet of stretchable material, such as tricot, the roll of filler material such as felted fibres, and the roll of facing sheet are placed on their respective brackets as shown in FIGS. 1 and 3 and the stitching machine is set in motion.

The marginal side edges of the foundation sheet on the roll 73 are engaged by the pins of the chains as the chains are carried by the front sprocket wheels 40 and 41 from the lower to the upper reach. The foundation sheet is thereby carried by the chains to the quilting machine and is stretched transversely as the chains, leaving the planes of rotation of the sprocket wheels, curve concavely as shown in FIG. 2 to be engaged by the guide sprocket wheels 53 and 54 in their respective planes of rotation. The extent of stretching is more than a mere tautening of a fabric and may, for example, be from an unstretched width of 27" to a stretched width of 45".

During this travel the sheet is supported at its edges by the plates or strips 76 shown in cross section in FIG. 6 while the chains are supported on the rails 73, the sheet being supported between its edges by the bars 83, 84 and 85 as shown in FIG. 2. As the sheet, engaged by the pins of the chains, is drawn from the roll, its edges are pressed by the plates 77, FIG. 7, downwardly on the pins and, in its further travel toward the quilting machine, is pressed by the strips 81 onto the plates 76 to ensure engagement by the pins.

As the foundation sheet reaches the quilting machine, filler material is drawn from the supply roll 89 and laid on the stretched foundation sheet and facing sheet drawn from the roll 94 and laid on the filler layer. Neither the filler nor the facing sheet are stretched and their width is equal to the width of the foundation sheet, when stretched, between the edge margins. As the assembly of foundation sheet, filler and facing sheet is stitched and passes beyond the stitching needles it is drawn through the nips of the drawing rolls 29, 30 and 31, being thus freed from the pins of the chains which turn about the rear sprocket wheels 59 to the lower reach and thence to the front sprocket wheels. As the stitched or quilted assembly leaves the drawing rolls the tensioning is released, the assembly contracts transversely and is taken up by the take-up roll 32.

The position of the assembly of fabric elements relative to the needles of a row of stitching needles is shown in FIG. 8 in cross section. In this figure the position of two needles 104 and 105 is shown piercing the assembly of the foundation sheet 18 in its stretched condition, and the filler layer 106 and facing sheet 107 pressed between a supporting plate 108 and a presser plate 109. The elements of the assembly are secured together at the lines of stitching which are in the positions of the needles. When the assembly is released the tension on the foundation sheet is released and the assembly contracts. The foundation sheet in contracting remains in a flat condition while the filler and facing sheet do not contract. The resulting structure is shown in cross-section in FIG. 9, the filler 106 and facing sheet 107 being puffed out or puckered.

This gives a novel appearance to the fabric and it also gives the advantage that the fabric may stretch without stretching the filler and facing sheet which therefore need not be of stretchable material. For example an article of wearing material of the present invention may have a facing sheet of wind and rain resistant material and weave, which can not be made to stretch and yet permits stretching to give the wearer greater freedom of action. This feature is also desirable in many other applications. Patterns and designs may be made by the stitchings by adjustment of the mechanisms for shifting the framework carrying the assembly during the stitching and by the use of more than one row of needles.

Having described my invention, I claim:

1. A quilting machine having apparatus for assembling and supplying elements to said quilting machine which comprises a pair of front sprocket wheels axially spaced and rotatable in vertical planes, a pair of guide sprocket wheels axially spaced more widely than said front sprocket wheels and rearwardly of said front sprocket wheels and rotatable in vertical planes, a pair of endless chains extending in divergent upper reaches one each from one of said front sprocket wheels to one of said guide sprocket wheels, a series of pins mounted on each of said chains inboard of said chains and pointing upwardly in said upper reaches, means immediately in front of said front sprocket wheels to mount a roll of stretchable foundation sheet to engage its side edge margins with successive pins on said chains as said chains travel in their upper reaches from said front sprocket wheels to said guide sprocket wheels thereby stretching said stretchable foundation sheet transversely to its direction of travel, means above the upper reach of the chains passing from said front sprocket wheels to said guide sprocket wheels to support a roll of facing sheet to supply said facing sheet in unstretched condition to the upper surface of said foundation sheet and means to move said chains in their upper reaches beyond said guide sprockets to the quilting machine.

2. The apparatus of claim 1 in which said guide sprockets rotate in parallel vertical planes and in which said front sprocket wheels rotate in vertical planes diverging rearwardly to intersect the parallel planes of rotation of said guide sprocket wheels in advance of said guide sprocket wheels.

3. The apparatus of claim 1 comprising means to support said chains from sagging in their upper reaches between said front sprocket wheels and said guide sprocket wheels.

4. The apparatus of claim 3 comprising means to support said foundation sheet between said chains in the region between said front sprocket wheels and said guide sprocket wheels.

5. The apparatus of claim 4 in which said supporting means comprises bars diverging rearwardly from between said front sprocket wheels.

6. The apparatus of claim 5 comprising a supporting plate extending forwardly and downwardly from said bars in a cylindrical curvature between said front sprocket wheels and a pair of supporting arms for the roll of foundation sheet sloping downwardly toward said downturned portion of said plate to limit said roll to contact with the tips of the pins of said chains.

7. The apparatus of claim 1 comprising means to mount said front sprocket wheels adjustably in a direction transverse to their planes of rotation and means to move said mounting means transversely to the planes of rotation of the sprocket wheels.

8. The apparatus of claim 7 in which said means to mount said front sprocket wheels adjustably and to move them transversely comprises rods extending transversely of the planes of rotation of said sprocket wheels, a pair of brackets slidably mounted on said rods on each of which one of said sprocket wheels is mounted and a screw for each bracket rotatable in an axially fixed position and having a threaded engagement with one of said brackets.

9. The apparatus of claim 8 comprising a pair of chain supporting beams each one connected to one of said brackets by a hinge connection permitting said beams to extend rearwardly toward said guide sprockets and to swing transversely of the planes of rotation of said front sprocket wheels and means rearwardly of said hinge connection to adjust said beams to different degrees of divergence of said beams.

10. The apparatus of claim 1 comprising supports, one inboard of each chain to support the edge margins of the foundation sheet between said front sprocket wheels and said guide sprocket wheels and presser plates one for each said support overlying said supports.

11. The apparatus of claim 1 which comprises a support for each of said chains underneath its respective chain, a support for the edge margins of the foundation sheet supported inboard of the adjacent chain support and above said chain support and a presser plate overlying each said margin support to retain the respective margin of the foundation sheet on its respective support.

12. The apparatus of claim 1 comprising a drive sprocket wheel drivable from the quilting machine and engaging one of said chains shortly in advance of the guide sprocket wheels.

13. A quilting machine including a fabric feed mechanism having apparatus for assembling and supplying elements to said quilting machine which comprises a pair of spaced beams attached to the fabric feed mechanism of said quilting machine and inclined downwardly and forwardly from said fabric feed mechanism, a pair of legs supporting said beams at their forward ends to form a frame, wheels supporting said legs in movement transverse to the lengths of said beams, spaced supporting rods extending from one of said beams to the other, a pair of brackets slidably mounted in spaced positions on said supporting rods, means to adjust the spacing of said brackets, a pair of front sprocket wheels mounted one on each bracket to rotate in rearwardly diverging vertical planes, a pair of endless chains one trained about each of said front sprocket wheels and extending in upper reaches in rearwardly divergent paths to the fabric feed mechanism of said quilting machine, supports extending rearwardly from said brackets, one for each chain in its upper reach to said quilting machine, a series of pins mounted inboard on each of said chains and pointing upwardly in the upper reaches of said chains, means mounted on said frame to support a roll of stretchable foundation sheet rotatably tangent to and in contact at its edge margins with the pins of said chains trained on said front sprocket wheels to stretch said foundation sheet transversely to its direction of travel, and means supported on said frame to mount rotatably above said frame a roll of filler material and a roll of facing sheet to deliver filler material on said foundation sheet carried by said chains and facing sheet on said filler material in unstretched condition.

14. A quilting machine and supply mechanism therefor which comprises a stitching element for stitching together quilting elements in spaced stitchings, a fabric feed means for feeding super-posed fabric elements through said stitching element and comprising feed rolls rearwardly of the stitching element to draw the quilted material through the stitching element, and apparatus for assembling and supplying elements to said quilting machine which comprises a pair of front sprocket wheels axially spaced in vertical planes, a pair of guide sprocket wheels mounted on said quilting machine axially spaced more widely than said front sprocket wheels and rotatable in parallel vertical planes, a pair of endless chains extending in divergent upper reaches one chain from each of said front sprocket wheels to one of said guide sprocket wheels and thence rearwardly through said quilting machine, a pair of rear sprocket wheels spaced apart and in position to support said chains and to return them in a lower reach to said front sprocket wheels, means to drive said chains from said feed rolls of said quilting machine, a series of pins mounted on each of said chains inboard of said chains and pointing upwardly in said upper reaches, means to mount a roll of stretchable foundation sheet to engage its side edge margins with successive pins on said chains as said chains travel in their upper reaches from said front sprocket wheels to said guide sprocket wheels thereby stretching said foundation sheet transversely of its direction of travel, means to support a roll of facing sheet to supply said facing sheet to the upper surface of said foundation sheet in unstretched condition.

15. The apparatus of claim 14 comprising a pair of beams extending forwardly from and secured to the fabric feed means of said quilting machine and slidable transversely therewith, a pair of legs supporting said beams near their front ends, a pair of wheels supporting said legs for movement transversely of said beams, spaced transverse rods extending between the forward positions of said beams, brackets slidably mounted on said rods and carrying said front sprocket wheels, and means to move said front sprocket wheels to adjusted distances apart.

16. The apparatus of claim 15 having chain supporting beams hinged at their front ends to said brackets and extending rearwardly in adjustably divergent positions.

References Cited by the Examiner

UNITED STATES PATENTS

| | | | |
|---|---|---|---|
| 857,968 | 6/07 | Wertheim | 112—414 |
| 1,594,979 | 8/26 | Rockwood | 112—414 |
| 1,921,691 | 8/33 | Mitchell | 112—2 X |
| 2,045,363 | 6/36 | Mitchell | 112—2 |
| 2,398,063 | 4/46 | Weidenfeld | 26—54 |
| 2,434,111 | 1/48 | Hawley et al. | 26—57 X |
| 2,564,959 | 8/51 | Corallo | 112—414 |
| 2,687,703 | 8/54 | Shotsky | 112—117 X |
| 2,895,438 | 7/59 | Shotsky | 112—117 X |
| 3,104,633 | 9/63 | Newman | 112—2 |

FOREIGN PATENTS

| | | |
|---|---|---|
| 1,258,476 | 3/61 | France. |
| 6,104 | 1831 | Great Britain. |

JORDAN FRANKLIN, *Primary Examiner.*